Oct. 31, 1933.  S. KALMAR  1,933,436
FLOATING CLUTCH
Filed Feb. 2, 1932  4 Sheets-Sheet 1
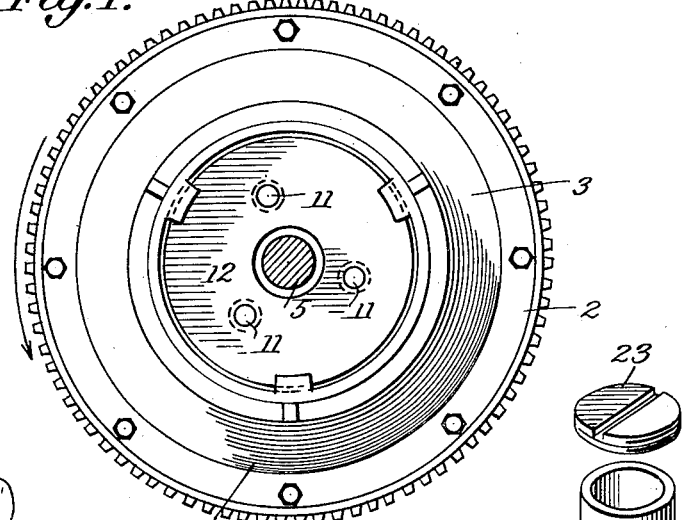
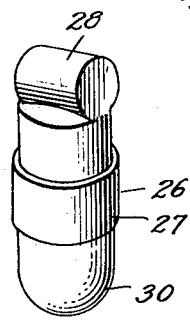
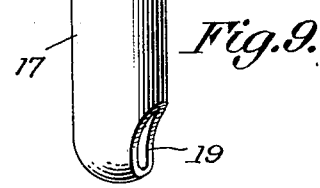
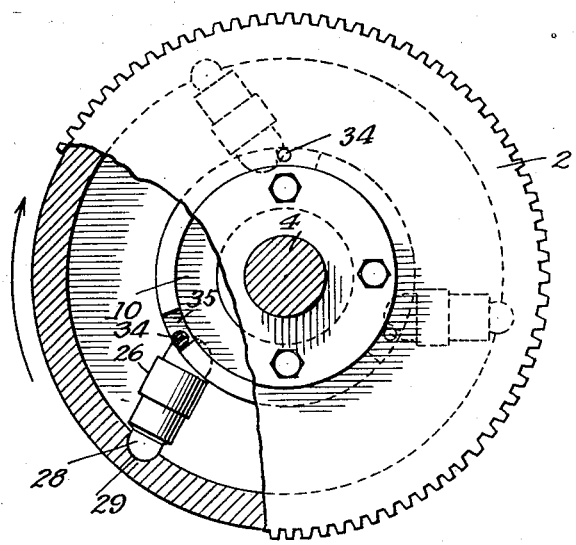
Stephen Kalmar
INVENTOR
BY Victor J. Evans & Co.
ATTORNEYS Oct. 31, 1933.  S. KALMAR  1,933,436
FLOATING CLUTCH
Filed Feb. 2, 1932   4 Sheets-Sheet 2
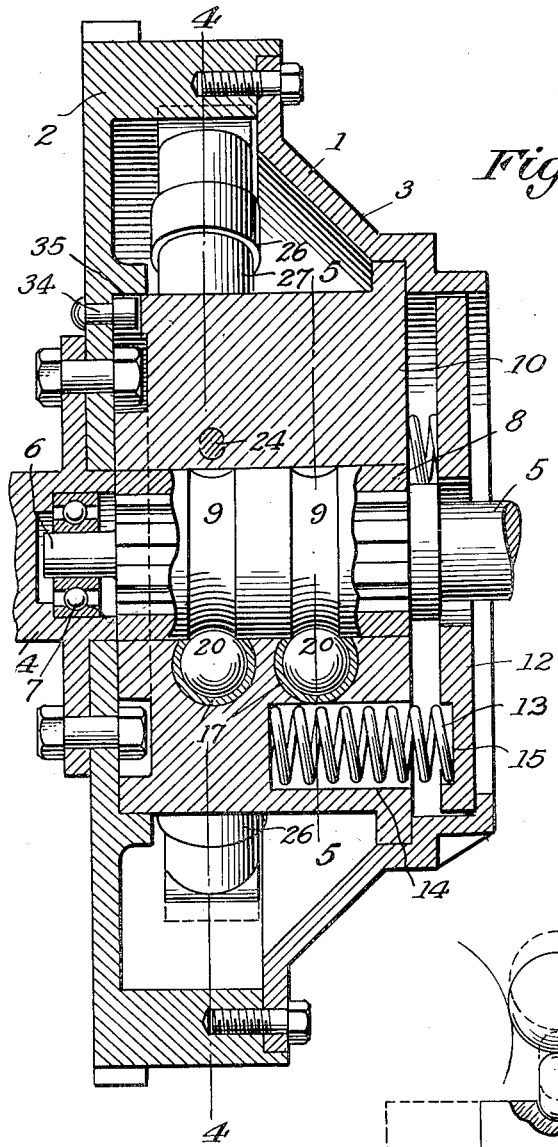
Stephen Kalmar
INVENTOR
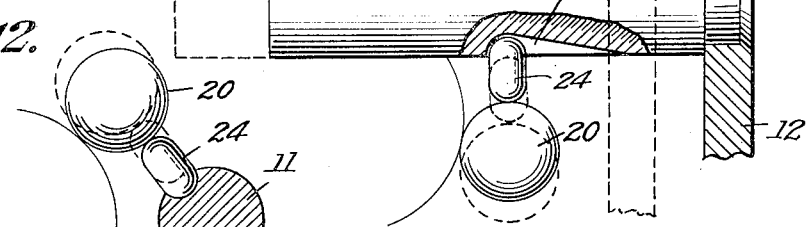
ATTORNEYS Oct. 31, 1933.  S. KALMAR  1,933,436
FLOATING CLUTCH
Filed Feb. 2, 1932  4 Sheets-Sheet 3

Stephen Kalmar
INVENTOR
BY Victor J. Evans & Co.
ATTORNEYS

Oct. 31, 1933.　　　S. KALMAR　　　1,933,436
FLOATING CLUTCH
Filed Feb. 2, 1932　　　4 Sheets-Sheet 4

Stephen Kalmar
INVENTOR
BY Victor J. Evans & Co.
ATTORNEYS

Patented Oct. 31, 1933

1,933,436

UNITED STATES PATENT OFFICE 1,933,436

FLOATING CLUTCH

Stephen Kalmar, Pittsburgh, Pa., assignor of five per cent to Michael J. Baehr, Pittsburgh, Pa.

Application February 2, 1932. Serial No. 590,479

3 Claims. (Cl. 192—79)

This invention relates to floating clutches for connecting and disconnecting power and driven shafts and more particularly adapted for use on a motor vehicle between the power source and driven shaft thereof and has for the primary object, the provision of a device of the above stated character which will be simple and easy to operate and positive in action and have a cushioning action or shock absorbing effect when engaged to prevent sudden starting of the driven shaft by the power source.

With this and other objects in view, this invention consists in certain novel features of construction, combination and arrangement of parts to be hereinafter more fully described and claimed.

For a complete understanding of my invention, reference is to be had to the following description and accompanying drawings, in which Figure 1 is an end elevation partly in section illustrating a clutch constructed in accordance with my invention.

Figure 2 is a similar view illustrating the cushioning or shock absorbing means.

Figure 3 is a vertical sectional view illustrating the clutch.

Figure 7 is a perspective view illustrating an operating medium for the driving means.

Figure 8 is a perspective view illustrating one of the cushioning or shock absorbing devices.

Figure 9 is a perspective view illustrating a mounting employed in the driving means.

Figure 11 is a diagrammatical view illustrating the driving means between the clutch element and the operating means therefor.

Figure 12 is a diagrammatical view illustrating the positions occupied by the balls of the driving means when in locking and releasing position.

Figure 4:
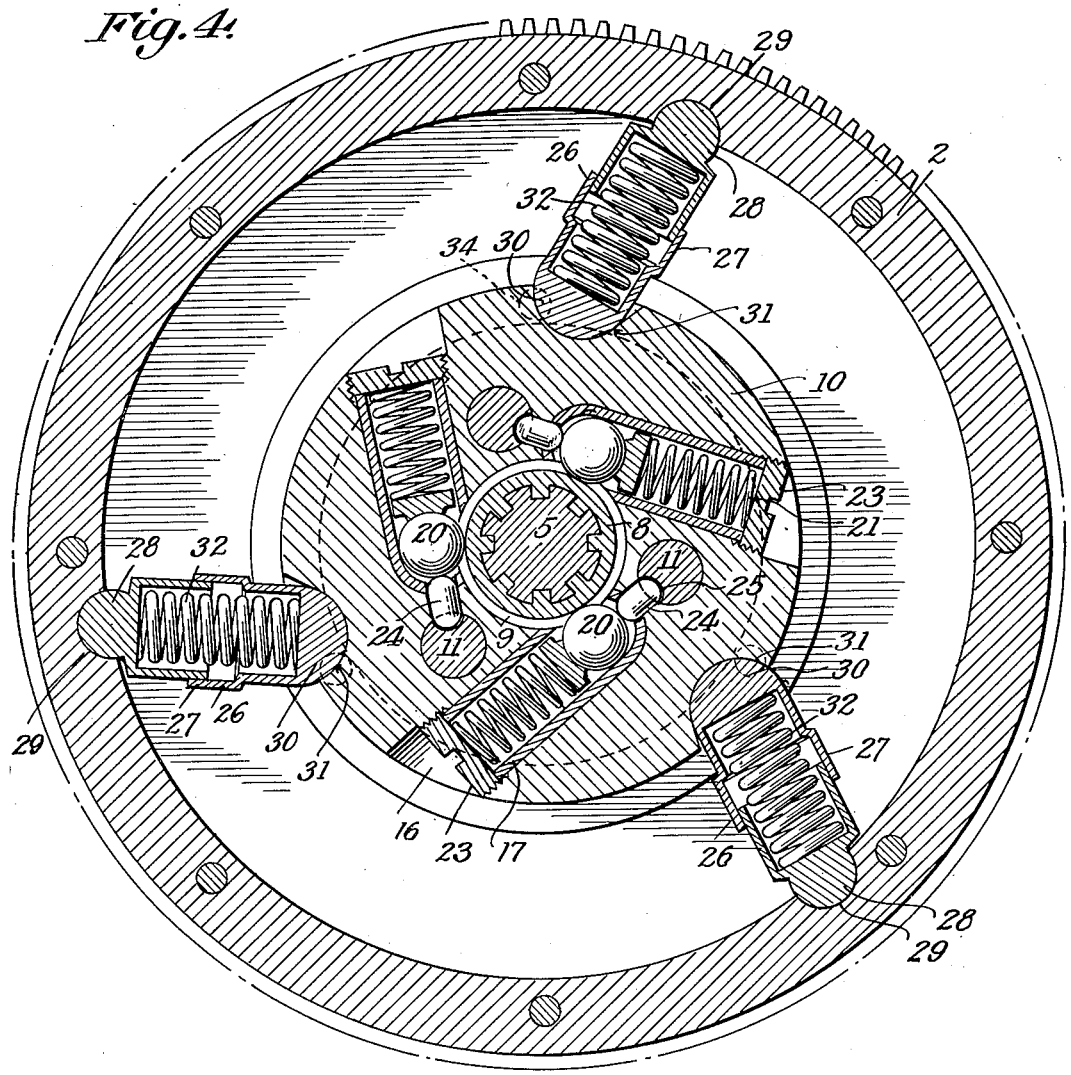
Figure 4 is a sectional view taken on the line 4—4 of Figure 3.
Figure 10:
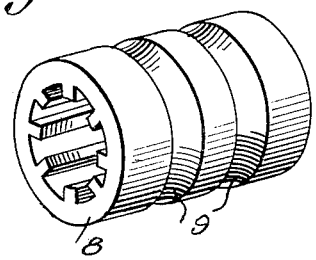
Figure 10 is a perspective view illustrating a sleeve constituting one of the clutch elements.

Referring in detail to the drawings, the numeral 1 indicates a clutch housing including sections 2 and 3 detachably secured together and the section 2 is preferably in the form of a fly wheel bolted or otherwise secured to the crank shaft 4 of an engine. The section 3 is preferably of bell shape and has extending therein a driven shaft 5, the forward end of which is provided with a trunnion 6 supported by an antifriction bearing 7 mounted in a socket formed in the end of the crank shaft for the purpose of retaining the driven shaft in alignment with the crank shaft. A clutch element 8 in the form of a sleeve is keyed to the driven shaft 5 within the housing 1 and is provided with spaced annular grooves 9. A clutch element 10 is journalled on the clutch element 8 and is provided with a plurality of sockets to slidably receive studs or stems 11 carried by an operating plate 12. The operating plate 12 is apertured to slidably receive the driven shaft 5 and provides a closure for the section 3 of the clutch housing. The plate 12 is normally urged away from the clutch element 10 by expansion springs 13 mounted in recesses 14 in the clutch element 10 and seats 15 in the plate 12. A suitable operating mechanism (not shown) may bear against the plate 12 for urging the latter towards the clutch element 10 against the action of the springs 13.

Figure 5:
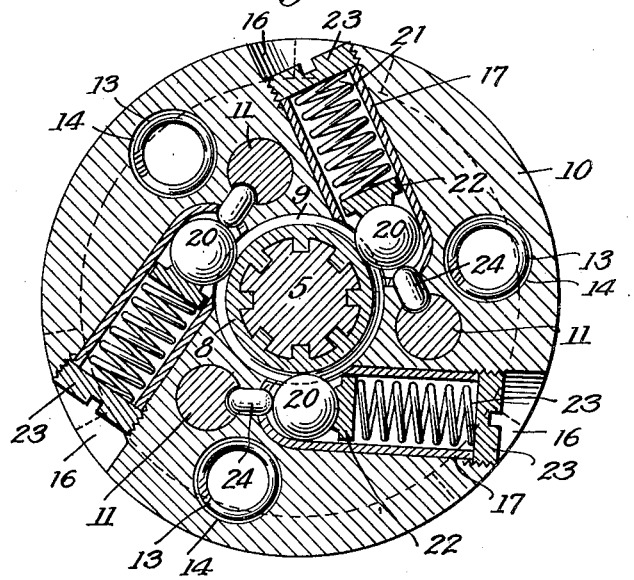
Figure 5 is a transverse sectional view illustrating the driving means between the clutch elements in a locked position.
Figure 6:
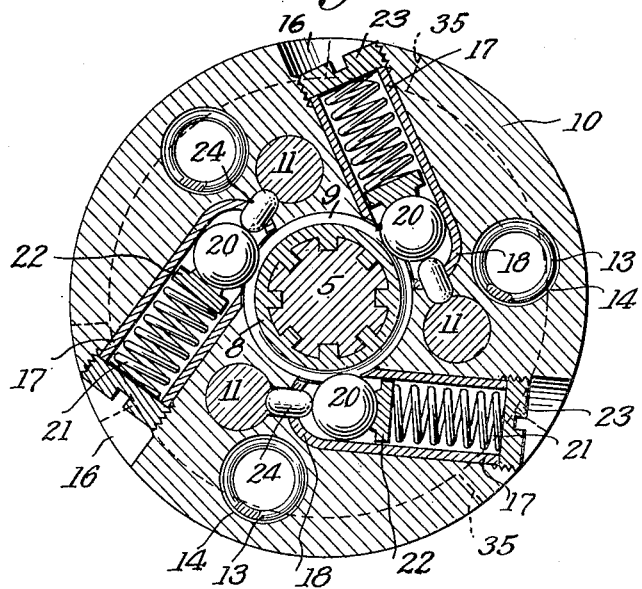
Figure 6 is a view similar to Figure 5 showing the driving means in a released position.

The clutch element 10 has formed therein passages 16 that open outwardly through the periphery of the clutch element 10 and also into the bore thereof and said passages are arranged in a pair of groups and the passages of one group are reversely arranged to the other group. One group of passages is shown in Figure 4, while the other group of passages is shown in Figure 5. The groups of passages 16 are arranged at an inclination to the axis of the clutch element 10 and have located therein sleeves or mountings 17 of substantially tubular formation with their inner ends closed by curved walls 18. The mountings 17 are provided adjacent their inner ends with openings 19 to permit balls or spherical elements 20 slidably mounted within said mountings to move into and out of the grooves 9 of the clutch element 8. The balls or spherical elements 20 are normally urged toward the inner ends of the mountings by expansion springs 21. The springs 21 engage followers 22 that engage the balls or spherical shaped elements 20 and said springs also bear against plugs 23 threaded into the passages 16 and form closures for the outer ends of the mountings 17. The inner ends or curved walls 18 of the mountings 17 are provided with openings to receive pins 24 slidably mounted in the clutch element 10 and having rounded ends. The pins bear against the balls or spherical shaped elements 20 and against the studs 11 and the latter are provided with tapering grooves 25 to receive the pins 24. The grooves 25 besides tapering from one end towards the opposite end also vary in depth from one end towards the opposite end so that when the operating plate 12 is moved towards the clutch element 10, the pins 24 move into the shallower parts of the grooves forcing the balls or spherical shaped elements 20 outwardly of the grooves 9 and against the action of the springs 21 to free the clutch elements 8 and 10 from each other. As soon as the operating plate 12 is released, the springs 13 return the same to its normal position allowing the springs 21 to force the balls into the grooves 9 to establish driving connection between the clutch elements 8 and 10. The parts of the device thus positioned lock the driven shaft 5 to the crank shaft 4 for rotation in either direction.

Cushioning or shock absorbing means 26 are provided between the fly wheel or section 2 of the clutch housing and the clutch element 10 for the purpose of providing a driving connection between said parts capable of a limited yielding action. The shock absorbing devices 26 each includes a casing 27 of telescopic sections and one section has formed thereon a semi-cylindrical shaped element 28 seating in a socket 29 formed in the section 2 of the clutch housing 1 while the end of the other section of the casing 27 is of semi-spherical shape as shown at 30 and seats in a socket 31 in the clutch element 10 thus permitting the casing 27 to have a pivotal action between the clutch element 10 and the section 2 of the clutch housing or fly wheel. Strong expansion springs 32 are mounted in the casings 27 to normally urge the sections of the casings apart. By referring to Figure 4 it will be seen that the casings 27 are arranged between the clutch element 10 and the fly wheel at an inclination so that when the fly wheel moves in a counterclockwise direction with the load applied to the clutch element 10 there is a tendency for the casings 27 to move into radial positions and thereby establish a yieldable driven connection between the fly wheel and the clutch element 10 to gradually absorb the load on the driven shaft 5 and thereby prevent shocks or sudden jerks to the driven shaft 5 when the fly wheel starts in motion. The strength of the springs 32 is such as to prevent the casings 27 from pivoting into or beyond a true radial position from that occupied as shown in Figure 4 thereby preventing the clutch element 10 from becoming disconnected from the fly wheel. The clutch housing 1 carries stops 34 which extend into short grooves 35 of the clutch element 10 for limiting the rotation thereof relative to the housing 1.

From the foregoing it will be seen that the clutch element 10 has a floating action relative to the fly wheel and will provide a cushioning action to absorb shocks when the fly wheel starts in motion to turn the driven shaft.

While I have shown and described the preferred embodiment of my invention, it will be understood that minor changes in construction, combination and arrangement of parts may be made without departing from the spirit and scope of my invention, as claimed.

Having thus described my invention, what I claim is:

1. A clutch comprising a pair of clutch elements one arranged within the other and capable of free rotation relative to each other, the inner clutch element having annular grooves, the outer clutch element having groups of passages arranged at an inclination to the axis of the inner clutch element and the passages of one group reversely arranged to the passages of the other group, said passages having communication with the grooves, mountings removably secured in said passages and having openings, spring pressed balls in said mountings and engaging in the grooves by way of the openings, and means for moving the balls out of the grooves to free the clutch elements.

2. A clutch comprising a pair of clutch elements one arranged within the other and capable of free rotation relative to each other, the inner clutch element having annular grooves, the outer clutch element having groups of passages at an inclination to the axis of the inner clutch element and the passages of one group reversely arranged to the passages of the other group, said passages having communication with the grooves, mountings removably secured in said passages and having openings, spring pressed balls in said mountings and engaging in the grooves by way of the openings, spring pressed studs slidably mounted in the outer clutch element and rigidly connected with each other, and means operated by the movements of the studs to disengage the balls from the grooves.

3. A clutch comprising a pair of clutch elements one arranged within the other and capable of free rotation relative to each other, the inner clutch element having groups of passages at an inclination to the axis of the inner clutch element and the passages of one group reversely arranged to the passages of the other group, said passages having communication with the grooves, mountings removably secured in said passages and having openings, spring pressed balls in said mountings and engaging in the grooves by way of the openings, spring pressed studs slidably mounted in the outer clutch element and rigidly connected with each other, said studs having tapering grooves varying in depth, and pins carried by the outer clutch element engageable with the tapering grooves of the studs and the balls to disengage the balls from the annular grooves on the movement of the studs in one direction.

STEPHEN KALMAR.